United States Patent
Summa et al.

(10) Patent No.: US 11,130,060 B2
(45) Date of Patent: Sep. 28, 2021

(54) LIGHTING EFFECTS FOR APPLICATION EVENTS

(71) Applicant: Dell Products L.P., Round Rock, TX (US)

(72) Inventors: Erik Summa, Austin, TX (US); Amaury Brito Alvarez, Miami, FL (US); Jair Acevedo, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 81 days.

(21) Appl. No.: 16/656,432

(22) Filed: Oct. 17, 2019

(65) Prior Publication Data

US 2021/0113922 A1  Apr. 22, 2021

(51) Int. Cl.
| | |
|---|---|
| *A63F 13/537* | (2014.01) |
| *A63F 13/52* | (2014.01) |
| *A63F 13/58* | (2014.01) |
| *G06T 15/50* | (2011.01) |
| *G06T 7/90* | (2017.01) |

(52) U.S. Cl.
CPC ............ *A63F 13/537* (2014.09); *A63F 13/52* (2014.09); *A63F 13/58* (2014.09); *G06T 7/90* (2017.01); *G06T 15/50* (2013.01); *A63F 2300/303* (2013.01); *A63F 2300/65* (2013.01); *G06T 2200/24* (2013.01); *G06T 2207/10024* (2013.01)

(58) Field of Classification Search
CPC ......... G06T 15/50; G06T 7/90; G06T 15/506; G06T 15/60; G06T 15/80; G06T 15/06; G06T 11/001; A63F 13/50; G09G 5/02; G09G 5/10; G09G 5/06; G09G 2320/0666; G09G 2320/0626
See application file for complete search history.

(56) References Cited

U.S. PATENT DOCUMENTS

| | | | |
|---|---|---|---|
| 6,963,425 B1 * | 11/2005 | Nair ..................... | G06K 9/4652 358/1.9 |
| 7,950,003 B1 | 5/2011 | Duca et al. | |
| 8,496,484 B2 | 7/2013 | Setty | |
| 9,403,090 B2 | 8/2016 | Harris et al. | |
| 9,861,898 B2 | 1/2018 | Miura et al. | |

(Continued)

FOREIGN PATENT DOCUMENTS

| | | | | |
|---|---|---|---|---|
| WO | WO-2007045001 A1 * | 4/2007 | ........... | H04N 19/543 |
| WO | WO-2009090592 A1 * | 7/2009 | ............... | H04N 9/73 |

*Primary Examiner* — Todd Buttram
(74) *Attorney, Agent, or Firm* — Norton Rose Fulbright US LLP

(57) ABSTRACT

User interactions with information handling systems can be improved by providing real-time feedback to the user during use of an application on the information handling system. Lighting effects may be defined for application events and those lighting effects executed to provide the user with visual feedback that notifies the user of the application events. In one example involving a computer game, a user playing a computer game on an information handling system may be playing a character with an associate health bar. The amount of health in the health bar may increase or decrease during gameplay, and a lighting effect may be used as feedback to indicate to the user the application events corresponding to the increase or decrease of the character's health.

20 Claims, 11 Drawing Sheets

(56) References Cited

U.S. PATENT DOCUMENTS

| | | | |
|---|---|---|---|
| 10,449,461 B1 | 10/2019 | Verma et al. | |
| 2011/0075924 A1* | 3/2011 | Shrestha | H04N 1/6011 |
| | | | 382/167 |
| 2015/0036883 A1* | 2/2015 | Deri | G06K 9/00369 |
| | | | 382/103 |
| 2017/0228600 A1 | 8/2017 | Syed et al. | |
| 2019/0279402 A1* | 9/2019 | Panetta | G06T 7/10 |
| 2020/0004301 A1* | 1/2020 | Cai | G06F 1/1683 |
| 2020/0081680 A1* | 3/2020 | Im | G09G 3/2088 |
| 2020/0388206 A1* | 12/2020 | Bae | G09G 3/20 |

* cited by examiner

LIGHTING EFFECTS FOR APPLICATION EVENTS

FIELD OF THE DISCLOSURE

The instant disclosure relates to user feedback. More specifically, portions of this disclosure relate to lighting effects used to provide user feedback.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

User interactions with information handling systems can be improved by providing real-time feedback to the user during use of an application on the information handling system. According to embodiments of this disclosure, lighting effects may be defined for application events and those lighting effects executed to provide the user with visual feedback that notifies the user of the application events. In one example involving a computer game, a user playing a computer game on an information handling system may be playing a character with an associate health bar. The amount of health in the health bar may increase or decrease during gameplay, and a lighting effect may be used as feedback to indicate to the user the application events corresponding to the increase or decrease of the character's health. The lighting effects may be displayed through an attached peripheral, such as a keyboard having individually addressable lights or an LCD panel.

The application events and corresponding lighting effects may be defined as part of an application profile. The application profile may be defined by a user, pre-defined as part of a software installation, and/or downloaded from other sources, such as communities on the Internet, and installed on an information handling system. The application profile includes definitions of application events for an application. The application events may specify one or more regions of a window of the application to be monitored. Those regions may be monitored during execution of the application for certain activity that indicates an event occurring in the application. The application profile may also include a definition of a lighting effect to execute when a particular event is detected based on activity in the defined region. The application profiles may allow providing lighting effects without any hooks or special programming in the applications. Thus, the feedback through lighting effects may be provided for any application that the information handling system executes, which provides the user with significantly more opportunities for improved user experience and customized user experience than possible through particular code inserted in the applications.

According to one embodiment, a method may include monitoring a region of a window of an application that is defined in an application profile. The monitoring may occur during execution of the application on an information handling system and identify a change in displayed content in the region. The information handling system may analyze the content in the region to identify the occurrence of an application event based on rules defined in an application profile. For example, the display of certain colors or shapes within the region may identify an application event. In one embodiment, an amount of pixels within a particular color range within the region may indicate an amount of health, shield, or inventory items available to a user in a game. In another embodiment, the appearance of a check mark within a particular region may indicate that a certain feature or option has become available to a user of the application. In a further embodiment, the appearance of an indicator icon within the defined region may indicate a text message or e-mail message has arrived for the user. After the application event is identified, the information handling system may determine a lighting effect that corresponds to the application event based on, for example, a definition within the application profile or a default association. The information handling system may then execute the lighting effect, such as by sending instructions to attached peripherals (e.g., wired or wireless headsets, wired or wireless keyboards) and/or sending instructions to the cloud to control lighting devices in the vicinity of the information handling system (e.g., smart home lighting).

According to another embodiment, a method may include monitoring a region of a window of an application during execution of the application on an information handling system for a change in displayed content in the region corresponding to an application event; determining a lighting effect that corresponds to the application event; and executing the lighting effect. The lighting effect may be manually defined by a user by recording a screenshot of the window of the application before monitoring the region and receiving an indication of the region from the user. The lighting effect may be determined according to an application received before monitoring the region, wherein the application profile comprises a definition of the region, a definition of the application event, and a definition of the lighting effect. The executing of lighting effects may include transmitting an instruction to an attached keyboard having a plurality of lights corresponding to a plurality of keys of the keyboard, wherein the instruction comprises an assignment of a color to each of the plurality of lights, and/or transmitting an instruction to a lighting device to display a color specified by the lighting effect. In some embodiments, the method may further include executing an algorithm to identify the change in displayed content without a pre-determined definition of the application event. The algorithm may, for example, determine a dominant color within the defined region and transmit an instruction to an attached peripheral to display the first dominant color. In some embodiments, a change in dominant color within a defined region may be used to trigger the execution of a lighting effect.

In certain embodiments, a region of the window may be analyzed to determine a percentage of pixels matching a specified color, and an instruction may be transmitted to an attached peripheral to display a shade of the specified color corresponding to the determined percentage of pixels matching the specified color. For example, the more red pixels within a defined region of an application containing a health bar the brighter the red color displayed on a keyboard to indicate to the user that their health bar is almost empty.

In certain embodiments, a region of the window may be analyzed to determine a percentage of pixels matching a specified color, an instruction may be transmitted to an attached peripheral having a plurality of lights to activate a percentage of the plurality of lights corresponding to the percentage of pixels matching the specified color. For example, a green backlight of a number of keys may be turned on matching a percentage of pixels within the monitored region that are green. In such an embodiment, the health bar in the monitored region may be replicated on the keyboard such that as the health bar decreases the number of activated backlights on the keyboard proportionally decreases.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Lighting effects can bring additional excitement to computer applications by more fully engaging the user in the experience of the application. For example, during rapidly evolving displays of graphical information the user may better interpret the information through environmental lighting effects. Applications that may benefit from lighting effects may include, but are not limited, to computer games and video presentations. Some video games and other applications display status indicators that provide information to the user about the application. Those status indicators may be fixed in position on the application display. A fixed position may refer to a position that has a fixed absolute location on the screen, such that the status indicator is always located at the same (x,y) location, or refer to a position has a relative location on the screen, such that the status indicator is always located at the same (x,y) location on the screen relative to another item on the application display. An example relative location for a status indicator may be a certain number of pixels above a user character shown on the display screen. Another example of a relative location for a status indicator may be a certain number of pixels from a corner of the application window or a certain number of pixels from an edge based on a size or scaling of the application window.

Figure 1:
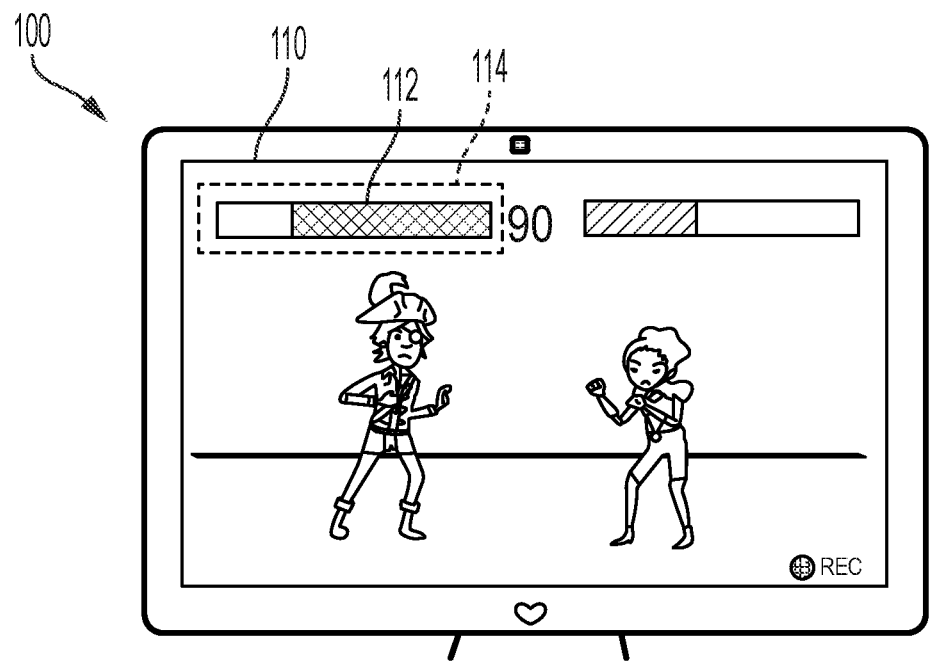
FIG. 1 is a screen shot showing an application window with status indicators for monitoring according to embodiments of the disclosure.

An example application window showing status indicators that may be monitored according to embodiments of the disclosure is shown in FIG. 1. FIG. 1 is a screen shot showing an application window with status indicators for monitoring according to embodiments of the disclosure. A display screen 100 may display one or more application windows under the control of a multi-tasking operating system. Each of the application windows may correspond to a different application or different process of an application executing on an information handling system. Application window 110 shows a display generated by a computer game executing on an information handling system. The application window 110 may include a status bar 112 indicating an amount of health points that a player's character has remaining. A separate application executing on the information handling system may have a profile corresponding to the particular application executing in application window 110 that defines a region 114 specifying the location of the status bar 112. That separate application may monitor the defined region 114 and determine lighting effects based on the contents of that region 114.

Figure 2:
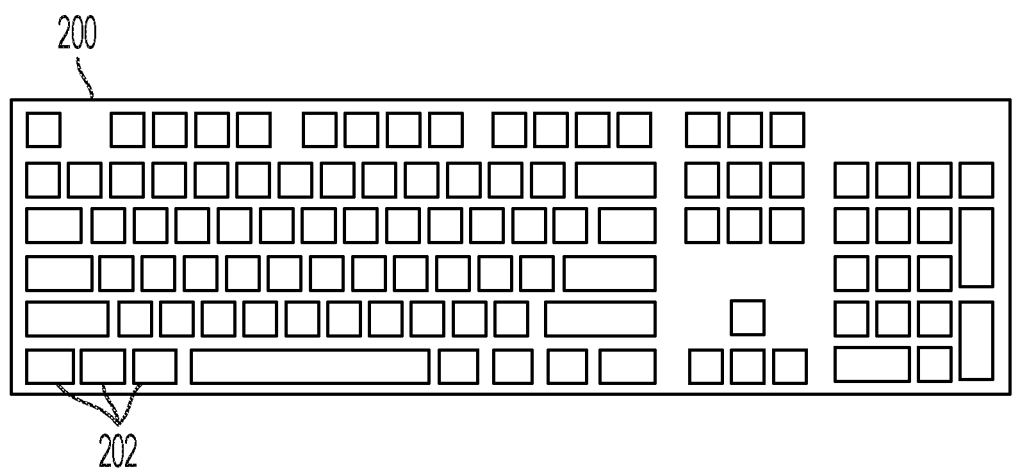
FIG. 2 is a top-down view of a keyboard illustrating one example lighting effect according to embodiments of this disclosure.

One example lighting effect that may be applied based on the contents of the application window 110 is lighting of individual keys on a keyboard coupled to the information handling system. FIG. 2 is a top-down view of a keyboard illustrating one example lighting effect according to embodiments of this disclosure. A keyboard 200 includes keys 202. The keyboard may be wirelessly coupled (such as by Bluetooth) or attached by wire (such as a Universal Serial Bus (USB)) interface to the information handling system. The keyboard 200 may include one or more lighting capabilities, including individually-addressable lights corresponding to individual keys or segments of keys within the keys 202 and/or a configurable backlight color for the keys 202 as a whole, individual keys within the keys 202, or segments of keys within the keys 202. One example lighting effect is to activate backlights on a percentage of keys within the keys 202 corresponding to the number of health points indicated by the status bar 112, such that the width of the status bar 112 is replicated on the keyboard 200. Another example lighting effect is to specify a color for the backlight of the keys 202 that corresponds to a color of the status bar 112. Thus, as the status bar 112 changes from green to yellow to red, the backlight from the keyboard 200 likewise changes from green to yellow to red.

These lighting effects may improve the user's experience by more fully engaging the user in the video game. A game player may have their eyes focused on one active part of the application window 110, such as at the location of the user's character, making it difficult for the game player to perceive information at the periphery of the display, such as the status bar 112. A game player may have to divert their eyes to the corner of the application window to view status bar 112 and possibly miss action in the game. The ambient lighting providing by lighting effects applied to keyboard 200 during gameplay may provide sufficient information to the user to understand information from status bar 112 without diverting their attention away from the game action. Although some examples of lighting effects and application types is described with reference to FIG. 1 and FIG. 2, other lighting effects may be defined and applications other than games may be monitored according to embodiments of this disclosure.

Application profiles for executing lighting effects as described in certain embodiments herein may allow the performance of lighting effects during execution of applications. The lighting effects may be performed without needing to have the lighting effects explicitly defined by the applications. Incorporating lighting effects into the applications may require using special application programming interfaces (APIs) by programmers of the applications to create the lighting effects. This may reduce the rate of incorporation of lighting effects into applications, and leave users with lighting devices with little engagement through the lighting effects. The definition of application profiles based on expected location of content within an application allows lighting effects to be made available to every application, regardless of whether the application programmer incorporated lighting effects. This allows lighting effects to be applied to legacy applications, for which lighting effects APIs may not have been available. This also allows lighting effects to be applied to applications for which the programmer chose not to incorporate lighting effects due to the complexity of incorporating additional APIs.

Figure 3:
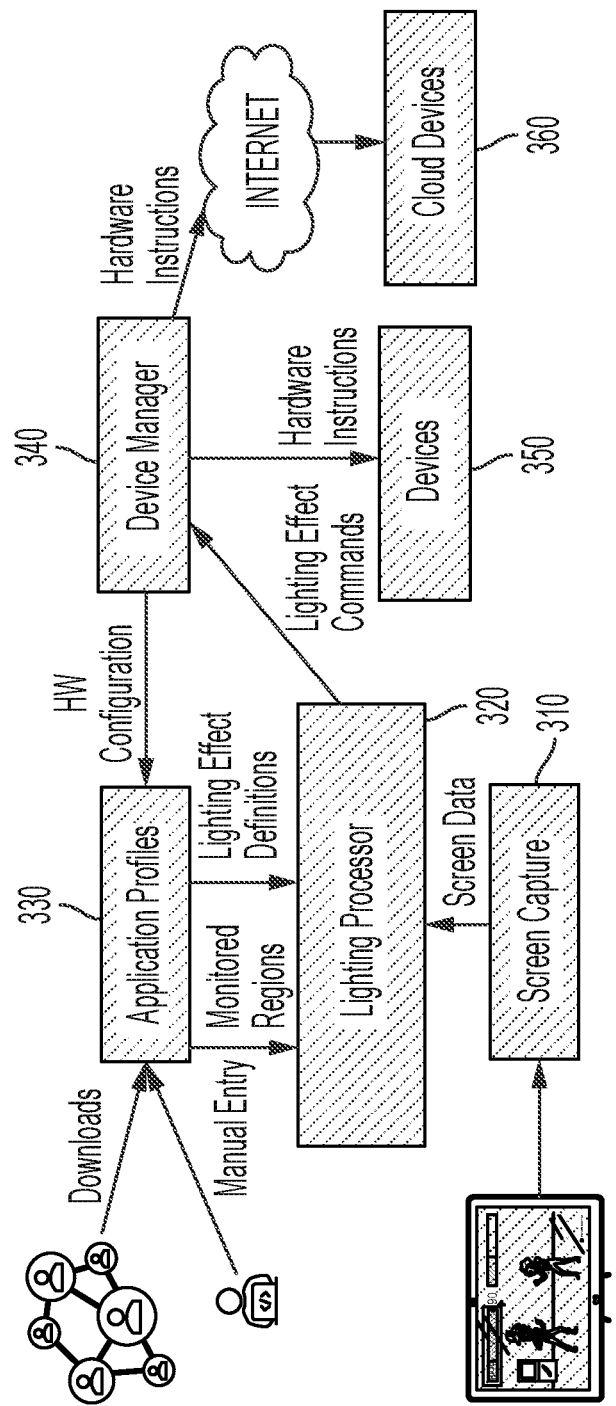
FIG. 3 is a block diagram illustrating application of lighting effects during execution of an application according to some embodiments of the disclosure.

One embodiment for implementation of lighting effects for an application on an information handling system is shown in FIG. 3. FIG. 3 is a block diagram illustrating application of lighting effects during execution of an application according to some embodiments of the disclosure. An application window 110 may be rendered by an information handling system and displayed on a display screen. The rendered screen may be captured by a screen capture tool 310. The screen capture tool 310 may obtain the rendered screen in parallel with the display of information in the application window 110, for example, through hooks in graphics APIs such as DirectX and OpenGL or through reading out the physical graphics memory. The screen capture tool 310 may alternatively obtain the rendered screen after display in the application window 110 through a screen capture. The screen data from the application window 110 is provided from the screen capture tool 310 to a lighting processor 320.

The lighting processor 320 generates lighting effect commands based on the provided screen data. The lighting effect commands are provided to a device manager 340 that controls hardware to carry out the lighting effect commands. For example, when the lighting processor 320 determines that a change in backlight color for a keyboard is triggered, the lighting processor 320 sends such a lighting command to the device manager 340. The device manager 340 then causes the information handling system to transmit commands over an input/output (I/O) bus to the keyboard.

The lighting processor 320 may be implemented as a rule-based engine, which processes rules defined in profiles by applying the screen data as input to the rules. The rules may determine application events have occurred by applying criteria specified in the lighting effect definitions to the corresponding monitored regions. For example, the lighting processor 320 may process a rule defining an application event occurs when the average color within the monitored region changes by more than a threshold amount, and that rule may specify that the color of a lighting effect to trigger based on the application event is to be based on an average color of the screen data in the monitored region. As another example, the lighting processor 320 may process a rule defining an application event occurs when a percentage of pixels within a specified color range (e.g., matching a specified color) is above or below a threshold value. The rules for defining what lighting effect commands to trigger may be provided by rules that correlate a monitored region of the application window 110 with a lighting effect definition. The set of one or more monitored regions and corresponding lighting effect definitions may be obtained from an application profile store 330.

The lighting processor 320 may be implemented as an application executing on a same or different processor that a processor executing the application that is generating the application window 110. The lighting processor 320 may alternatively be implemented as a separate hardware component, such as an application-specific integrated circuit (ASIC), separate from the processor executing the application that generates the application window 110. In some embodiments, the functionality of the lighting processor 320 may be shared between a generic processor and other hardware circuitry.

Referring now to the application profile store 330, the application profiles may define regions on a screen for determining occurrence of application events and may define lighting effects that occur in response to certain application events. For example, an application event may be triggered by a change in average color of pixels within the monitored region, such as occurs when a health status bar changes from green to yellow. As another example, an application event may be triggered by a change in number of pixels of a certain color within the monitored region, such as occurs when a health status bar remains the same color but decreases in width because a character's health status decreased. An application event may also be detected in a monitored region for applications other than games. For example, an "INS" insert status indicator may switch between a black "INS" and a gray "INS" in a word processor application to indicate whether the current typing mode is "insert" or "overwrite." An application event may be detected when "overwrite" mode is enabled, by determining that the number of black pixels in the region of the "INS" insert status indicator is below a threshold number. In response to that application event, a lighting effect that turns the keyboard backlight to the color red may be triggered. Another application event may be detected indicating the "INS" insert status indicator shows the current typing mode as "insert." A lighting effect that turns the keyboard backlight to the color white may be triggered in response to that application event.

An application profile may include one or more defined application events with corresponding lighting effects for an application. For example, the two example rules described above for lighting effects linked to an "INS" insert status indicator may be associated with a "WORD.EXE" application. Applications may be identified by filenames, process names, process identifiers, or other unique names. The lighting processor 320 may monitor screen data for an application window rendered by a particular application based on an application profile defined for that application. In some embodiments, the lighting processor 320 may operate as a background process on the information handling system that monitors all applications and activates application profiles by detecting the loading and executing of applications. In some embodiments, the lighting processor 320 may be launched in response to the loading of an application with a defined application profile. In some embodiments, the lighting processor 320 is hardware device that continuously monitors the screen data according to the application profiles.

The application profiles may be placed in the application profile store 330 from one or more sources. Example sources are shown in FIG. 3, and include downloads and manual entry. Application profiles may be manually entered into the application profile store 330 by a user, which allows complete customization of lighting effects with any application. Application profiles may be downloaded from a device manufacturer, such as a manufacturer of a keyboard. Such application profiles may allow a manufacturer to encourage purchasing their premium products offering lighting effects capabilities. Application profiles may also or alternatively be downloaded from a community group. Users that define their own lighting effects may share their application profiles with others, who may further customize the application profiles and share the revised application profiles. Application profiles may also be made available through any other technique for file sharing, such as USB drives, online cloud storage, CD-ROMs, e-mail, network file shares, and the like.

Figure 4A:
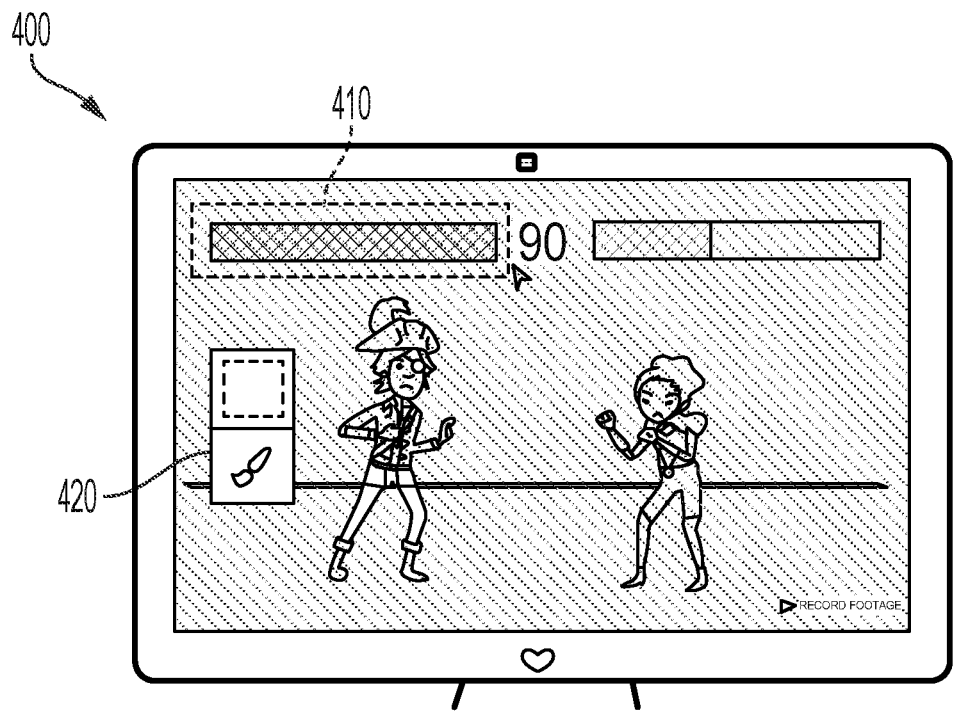
FIG. 4A is a screen shot showing manual entry of a monitored region for an application window according to some embodiments of the disclosure.
Figure 4B:
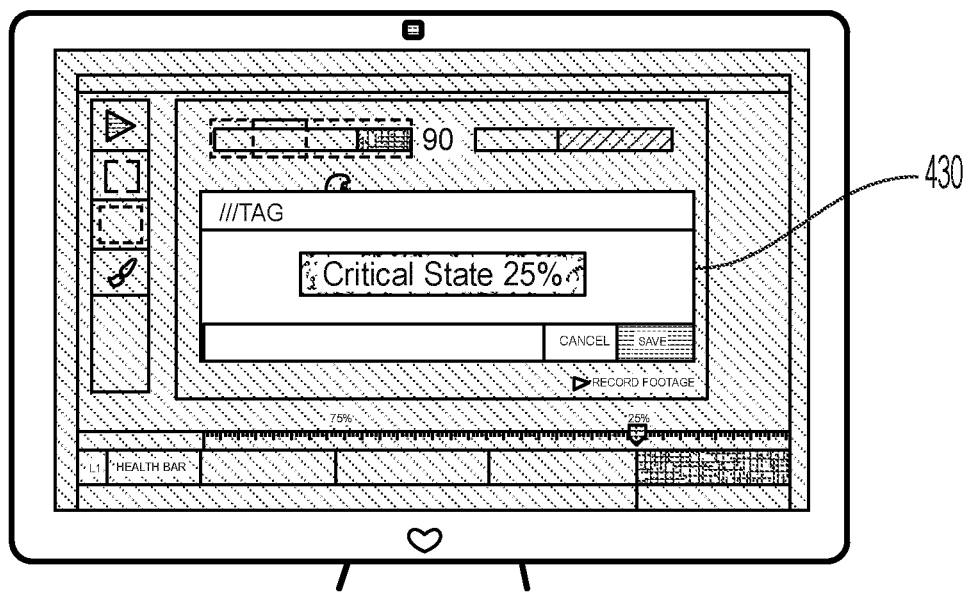
FIG. 4B is a screen show showing definition of an application event for a monitored region according to some embodiments of the disclosure.
Figure 4C:
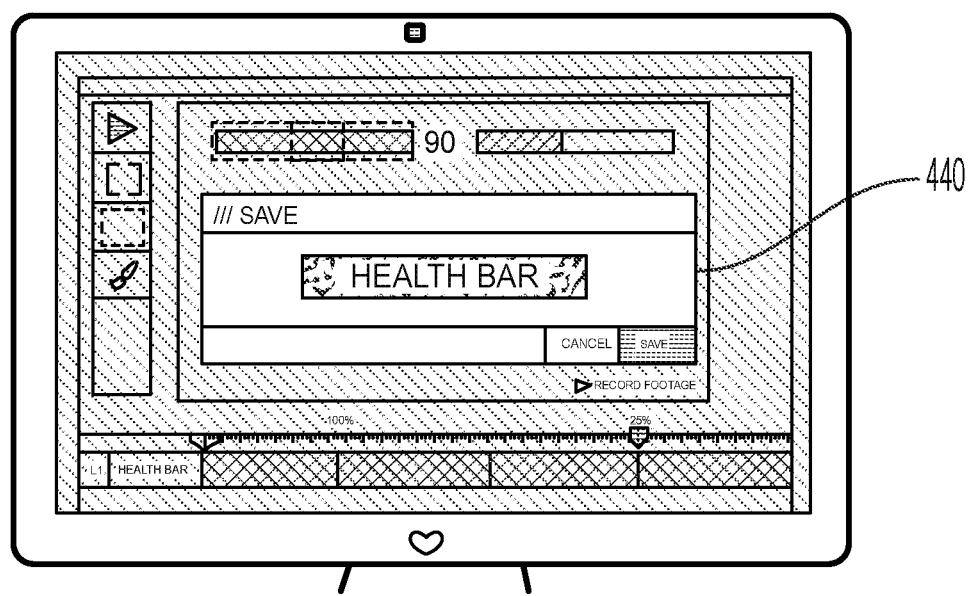
FIG. 4C is a screen shot showing a user defining a region or application event with a name according to some embodiments of the disclosure.
Figure 4D:
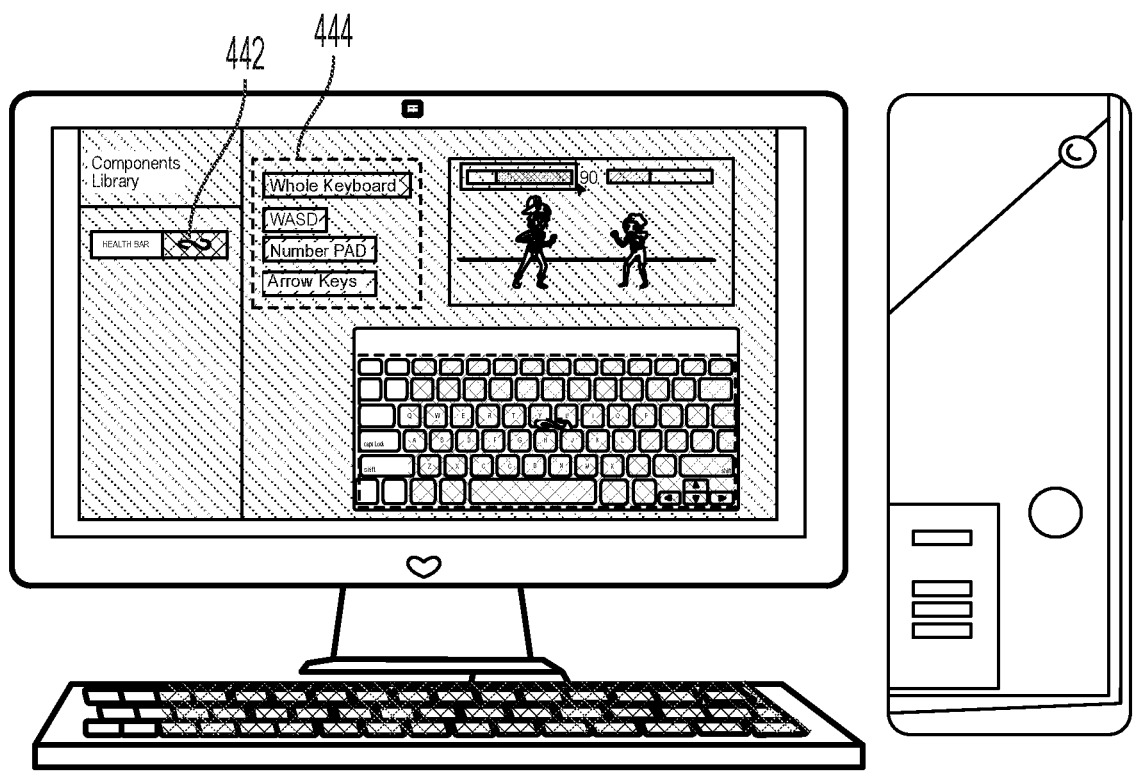
FIG. 4D is a screen shot showing a user defining a lighting effect according to some embodiments of the disclosure.

One example of manual user entry into the application profile store 330 is shown in FIGS. 4A-4D. FIG. 4A is a screen shot showing manual entry of a monitored region for an application window according to some embodiments of the disclosure. A screen shot 400 shows a rendered application screen, either from real-time rendering of the application or from a screen capture during earlier execution of the application. A user may define a region 410 in the application window using tools 420. After defining a monitored region, the user may define an application event that can be detected within the monitored region. FIG. 4B is a screen show showing definition of an application event for a monitored region according to some embodiments of the disclosure. A user may define a tag 430 for a "Critical State 25%" indicating an application event corresponding to the health bar in the monitored region 410 showing less than 25% of its pixels filled. A user may assign a descriptive name to the region, such as shown in FIG. 4C. FIG. 4C is a screen shot showing a user defining a region or application event with a name according to some embodiments of the disclosure. A name 440 of "Health Bar" may be assigned to the region 410 or the tag 430. A user may then define a lighting effect that accompanies the application event being detected in the monitored region, as shown in FIG. 4D. FIG. 4D is a screen shot showing a user defining a lighting effect according to some embodiments of the disclosure. A screen shot shows a user can define a color 442 for one or more parts 444 of a keyboard. The user interface, although not shown, may list other devices and lighting options based on information received from the device manager 340.

Referring back to FIG. 3, the device manager 340 may be a hardware or software component of the information handling system that controls devices 350 coupled to the information handling system. The device manager 340 may be, for example, part of an operating system executing on the information handling system. The device manager 340 may provide a hardware configuration, such as a listing of the devices 350 capable of performing lighting effects, to a user interface used to load application profiles into the application profile store 330. The hardware configuration may be used, for example, to limit selection of available application profiles at a community group to those compatible with the user's devices.

The device manager 340 also provides an interface to the devices 350 to carry out the lighting effects. The lighting processor 320 may send lighting effect commands to the device manager 340 through, for example, an application programming interface (API) or other operating system hooks. The lighting effect commands may designate a device that was reported in the hardware configuration as available on the information handling system and include a command to issue to that device. The device manager 340 may then translate the lighting effect commands into hardware instructions that are transmitted to the devices 350. One example transmission of hardware instructions may be commands sent over an input/output (I/O) bus, such as a Universal Serial Bus (USB), to a keyboard, mouse, headset, or monitor. Another example of hardware instructions may be commands sent over a network adaptor to a device, such as sending commands to light bulbs over Z-Wave, Zigbee, Bluetooth, or Wi-Fi. In some embodiments, cloud devices 360 not directly coupled to the information handling system may be controlled to implement lighting effects. The device manager 340 may transmit hardware instructions to cloud services over a network connection, such as the Internet, which control the devices. For example, a Wi-Fi controlled light bulb may be connected to a cloud service that can be communicated with by the information handling system over the Internet to implement lighting effects.

Figure 5:
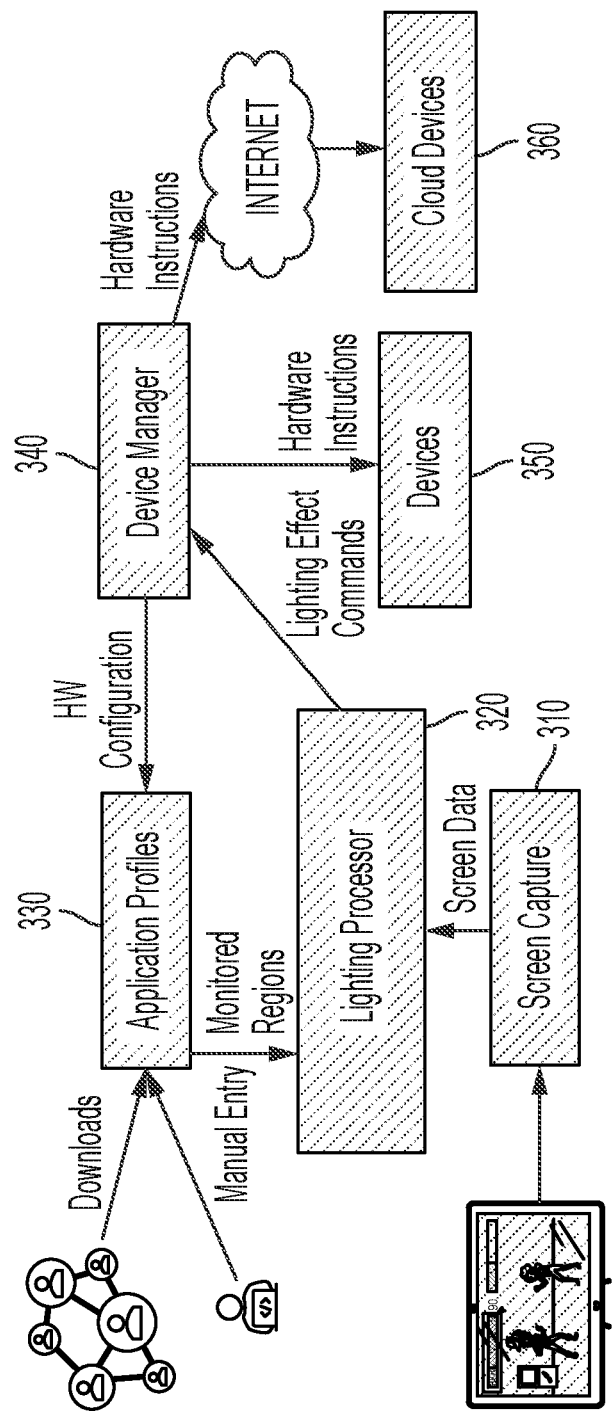
FIG. 5 is a block diagram illustrating application of lighting effects during execution of an application according to some embodiments of the disclosure.

In another embodiment of the lighting effect system of FIG. 3, the lighting processor 320 may implement an algorithm that generates the lighting effects autonomously. FIG. 5 is a block diagram illustrating application of lighting effects during execution of an application according to some embodiments of the disclosure. For example, the application profile provided to the lighting processor 320 in such an embodiment may include a definition for a monitored region but not a lighting effect definition. An algorithm within the lighting processor 320 may monitor screen data corresponding to the defined monitored region and generating lighting effects in accordance with the algorithm. For example, the lighting processor 320 may execute an algorithm that determines the average color within the monitored region changed by more than a threshold amount, and that rule may specify that the color of a lighting effect to trigger based on the application event is to be based on an average color of the screen data in the monitored region. As another example, the lighting processor 320 may execute an algorithm that determines that an event occurs when a percentage of pixels within a specified color range (e.g., matching a specified color) is above or below a threshold value. In some embodiments, an application profile may include a mix of rules that define monitored regions without corresponding lighting effects, such that the algorithm automates lighting effects for some regions, and rules that define monitored regions with corresponding lighting effects, such that manual lighting effects are provided for other regions.

Figure 6:
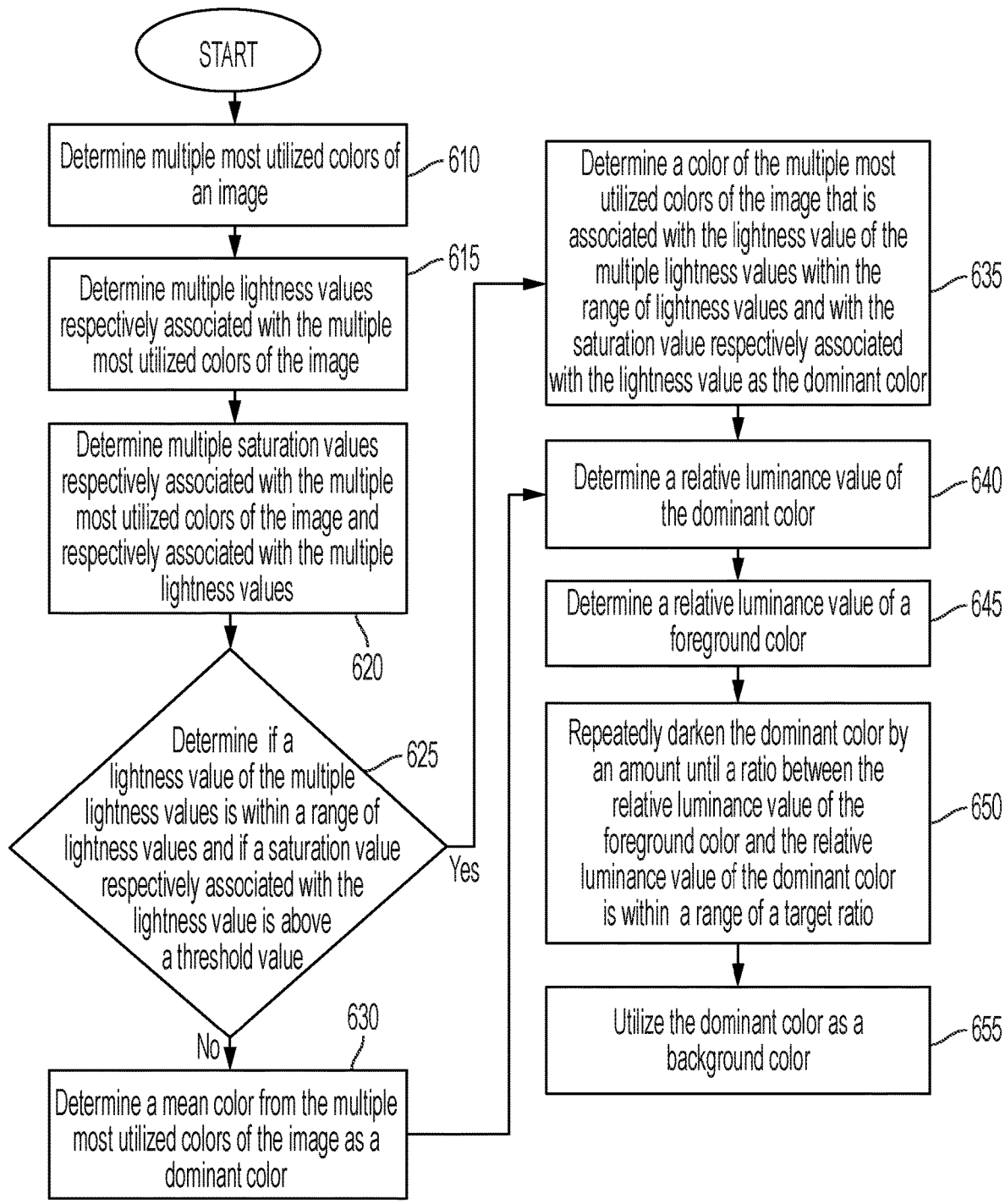
FIG. 6 is a flow chart illustrating the determination of a dominant color according to some embodiments of the disclosure.

One example of an algorithm implemented on lighting processor 320 for automatically generating lighting effects may be based on determining a dominant color for the application window or monitored region and applying the dominant color as a color for a lighting effect. One such example algorithm is shown in FIG. 6. FIG. 6 is a flow chart illustrating the determination of a dominant color according to some embodiments of the disclosure.

At block 610, multiple most utilized colors of an image may be determined. For example, a number of most utilized colors of a monitored region or application window may be determined. In one embodiment, sixteen most utilized colors of an image may be determined. At block 315, multiple lightness values respectively associated with the multiple most utilized colors of the image may be determined. In some embodiments, determining a lightness value from a color may include using a mapping of red (R), green (G), and blue (B) values of the color. In one example, determining a lightness value from a color may include determining an arithmetic mean of the red, green, and blue values of the color. In another example, determining a lightness value from a color may include determining an arithmetic mean of a sum of a maximum of the red, green, and blue values of the color and a minimum of the red, green, and blue values.

At block 620, multiple saturation values respectively associated with the multiple most utilized colors of the image and respectively associated with the multiple lightness values may be determined. In some embodiments, saturation of a color may be determined by a combination of light intensity and how much it is distributed across a spectrum of different wavelengths. For example, a saturation value may be a colorfulness of a color judged in proportion to its brightness. For instance, saturation may provide an effect that may be perceived as freedom from whitishness of light coming from the color. In some embodiments, a saturation value associated with a color may be determined to be zero if a lightness associated the color is zero. In some embodiments, a saturation value associated with a color may be determined to be zero if a lightness associated the color is one. In some embodiments, saturation in a HSL (Hue Saturation Lightness) model may be $$\frac{\max(R, G, B) - \min(R, G, B)}{1 - |\max(R, G, B) - \min(R, G, B) - 1|}$$

At block 325, it may be determined if a lightness value of the multiple lightness values is within a range of lightness values and if a saturation value respectively associated with the lightness value is above a threshold value. In some embodiments, the range of lightness values may be from ninety (90) to one hundred and eighty (180). In some embodiments, other ranges may be utilized. In some embodiments, the threshold value may be fifty (50). In some embodiments, other threshold values may be utilized.

If the lightness value of the multiple lightness values is not within the range of lightness values or if the saturation value respectively associated with the lightness value is not above the threshold value, a mean color from the multiple most utilized colors of the image as a dominant color may be determined, at block 630. In one example, determining a mean color from the multiple most utilized colors of the image as a dominant color may include determining an arithmetic mean of the multiple most utilized colors of the image as a dominant color. In another example, determining a mean color from the multiple most utilized colors of the image as a dominant color may include determining a geometric mean of the multiple most utilized colors of the image as a dominant color.

If the lightness value of the multiple lightness values is within the range of lightness values and if the saturation value respectively associated with the lightness value is above the threshold value, a color of the multiple most utilized colors of the image that is associated with the lightness value of the multiple lightness values within the range of lightness values and with the saturation value respectively associated with the lightness value may be determined as the dominant color, at block 635.

At block 340, a relative luminance value of the dominant color may be determined. In some embodiments, determining a relative luminance value from a color may include using normalized red, green, and blue values of the color. For example, color values of R, G, and B may be normalized with respect to two hundred and fifty-five (255) (e.g., color values of R, G, and B may be eight-bit values). In one example, $R_N=R/255$. In a second instance, $G_N=G/255$. In another instance, $B_N=B/255$. In some embodiments, determining a relative luminance value from a color may include determining a sum of a product of 0.2126 and $R_P$, a product of 0.7152 and $G_P$, and a product of 0.0722 and $B_P$. In one example, $R_P$ may be $R_N$ divided by 12.92 if $R_N$ is less than or equal to $K_O$; otherwise, $R_P$ may be $((R_N+0.055)/1.055)^{2.4}$. For instance, $$R_P = \begin{cases} \frac{R_N}{12.92} & \text{if } R_N \le K_O \\ \left(\frac{R_N + 0.055}{1.055}\right)^{2.4} & \text{otherwise} \end{cases}$$

wherein $K_O$ may be a constant. $K_O$ may be chosen based at least on an implementation, e.g., $K_O$ may be 0.03928, 0.04045, etc.

In a second example, $G_P$ may be $G_N$ divided by 12.92 if $G_N$ is less than or equal to $K_O$; otherwise $G_P$ may be $((G_N+0.055)/1.055)^{2.4}$. For instance, $$G_P = \begin{cases} \frac{G_N}{12.92} & \text{if } G_N \le K_O \\ \left(\frac{G_N + 0.055}{1.055}\right)^{2.4} & \text{otherwise} \end{cases}$$

wherein $K_O$ may be a constant. $K_O$ may be chosen based at least on an implementation, e.g., $K_O$ may be 0.03928, 0.04045, etc. In another example, $B_P$ may be $B_N$ divided by 12.92 if $B_N$ is less than or equal to $K_O$; otherwise $B_P$ may be $((B_N+0.055)/1.055)^{2.4}$. For instance, $$B_P = \begin{cases} \frac{B_N}{12.92} & \text{if } B_N \le K_O \\ \left(\frac{B_N + 0.055}{1.055}\right)^{2.4} & \text{otherwise} \end{cases}$$

wherein $K_O$ may be a constant. $K_O$ may be chosen based at least on an implementation, e.g., $K_O$ may be 0.03928, 0.04045, etc.

At block 645, a relative luminance value of a foreground color may be determined. In some embodiments, the foreground color may be or include a font color. In one example, the foreground color may be or include a font color utilized in the monitored region.

At block 650, the dominant color may be repeatedly darkened by an amount until a ratio between the relative luminance value of the foreground color ($RL_{foreground}$) and the relative luminance value of the dominant color ($RL_{background}$) is within a range of a target ratio. For example, the dominant color may be repeatedly darkened by an amount until $$\frac{RL_{foreground}}{RL_{background}} \approx \text{Target Ratio}$$

In one example, the target ratio may be four and one half (4.5). In another example, the ratio between the relative luminance value of the foreground color and the relative luminance value of the dominant color may be four and one half to one (4.5:1). In some embodiments, $RL_{foreground}$ may be modified by a constant and/or $RL_{background}$ may be modified by a constant. For example, the dominant color may be repeatedly darkened by an amount until $$\frac{RL_{foreground} + 0.05}{RL_{background} + 0.05} \approx \text{Target Ratio}$$

For example, the target ratio may be four and one half (4.5). In some embodiments, the foreground color may be or include a font color. In one example, the foreground color may be or include a font color associated with text in the monitored region.

In some embodiments, other target ratios between the relative luminance value of the foreground color and the relative luminance value of the dominant color may be utilized. In some embodiments, a range of a target ratio may be a percentage. For example, the dominant color may be repeatedly darkened by the amount until the ratio between the relative luminance value of the foreground color and the relative luminance value of the dominant color is within a percentage of the target ratio. In some embodiments, the dominant color may be repeatedly darkened by an amount until a ratio between the relative luminance value of the foreground color and the relative luminance value of the dominant color is within a range of a target ratio using an example of a method of darkening the dominant described with reference to FIG. 7.

At block 655, the dominant color may be utilized as a color for a lighting effect. For example, using the dominant color for a lighting effect may include displaying the dominant color as a backlight color on a keyboard.

Figure 7:
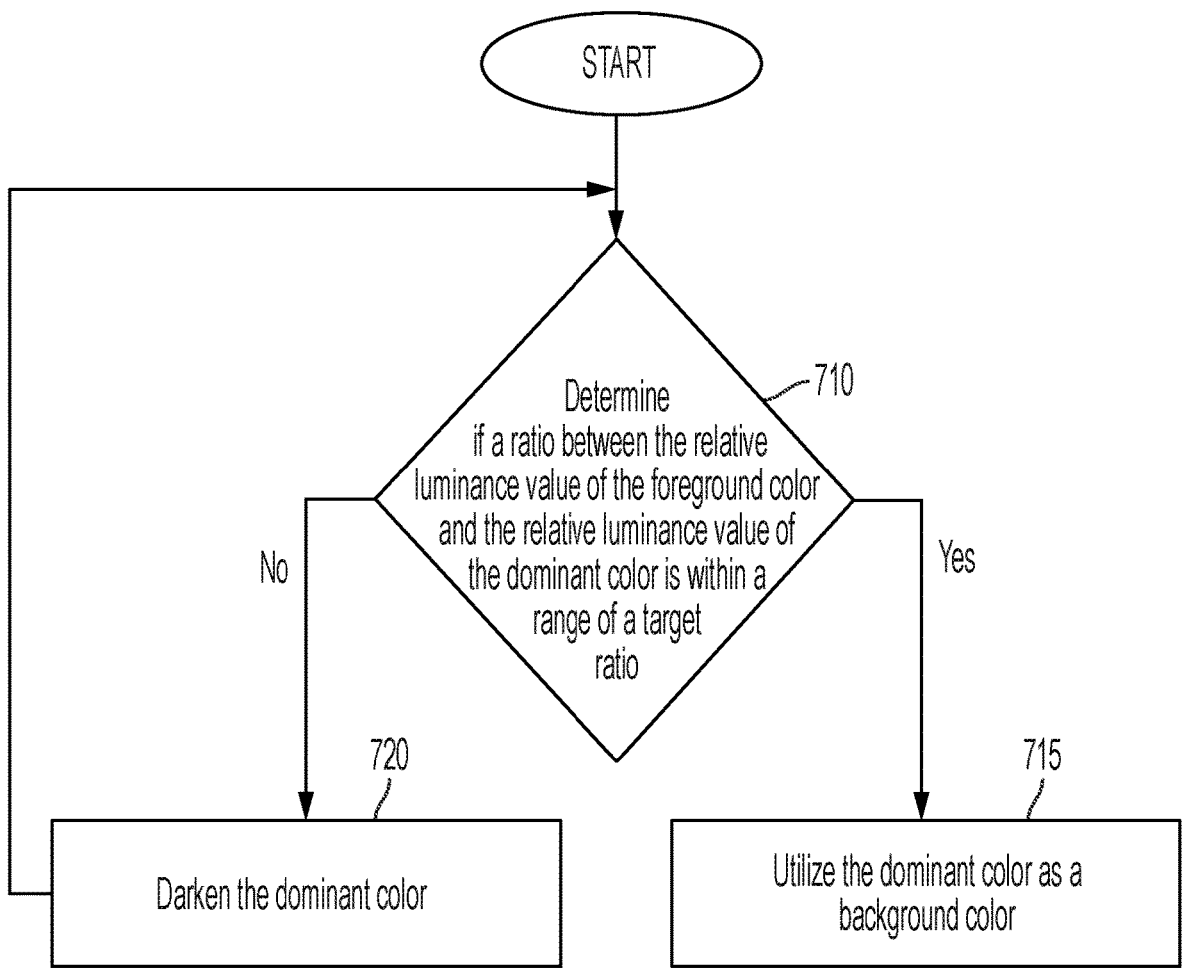
FIG. 7 is a flow chart illustrating an example of a method of darkening a dominant color according to some embodiments

Turning now to FIG. 7, an example of a method of darkening a dominant color is illustrated, according to some embodiments. At block 710, it may be determined if a ratio between the relative luminance value of the foreground color and the relative luminance value of the dominant color is within a range of a target ratio the dominant color. For example, it may be determined if $$\frac{RL_{foreground}}{RL_{background}} \approx \text{Target Ratio}$$

In one example, the target ratio may be four and one half (4.5). In another example, the ratio between the relative luminance value of the foreground color and the relative luminance value of the dominant color may be four and one half to one (4.5:1). In some embodiments, $RL_{foreground}$ may be modified by a constant and/or $RL_{background}$ may be modified by a constant. For example, it may be determined if $$\frac{RL_{foreground} + 0.05}{RL_{background} + 0.05} \approx \text{Target Ratio}$$

For example, the target ratio may be four and one half (4.5). If the ratio between the relative luminance value of the foreground color and the relative luminance value of the dominant color is within the range of the target ratio, the dominant color may be utilized as the lighting effect color, at block 715. If the ratio between the relative luminance value of the foreground color and the relative luminance value of the dominant color is not within the range of the target ratio, the dominant color may be darkened, at block 720, before using the dominant color as the lighting effect color. In some embodiments, darkening the dominant color may include reducing a relative luminance value associated with the dominant color. For example, the relative luminance value associated with the dominant color may be reduced by an amount. For instance, $RL_{background}$ may be reduced by an amount. In some embodiments, darkening the dominant color may include reducing R, G, and B values by an amount. In one example, R, G, and B values may be eight-bit values, and darkening the dominant color may include reducing each of the R, G, and B values by one. For instance, one may be subtracted from each of the R, G, and B values. In another example, R, G, and B values may be eight-bit values, and darkening the dominant color may include reducing each of the R, G, and B values by an integer number. For instance, the integer number may be subtracted from each of the R, G, and B values. In some embodiments, block 650 of FIG. 6 may include blocks 710 and 720 of FIG. 7. In some embodiments, block 655 of FIG. 6 may include block 715.

Figure 8:
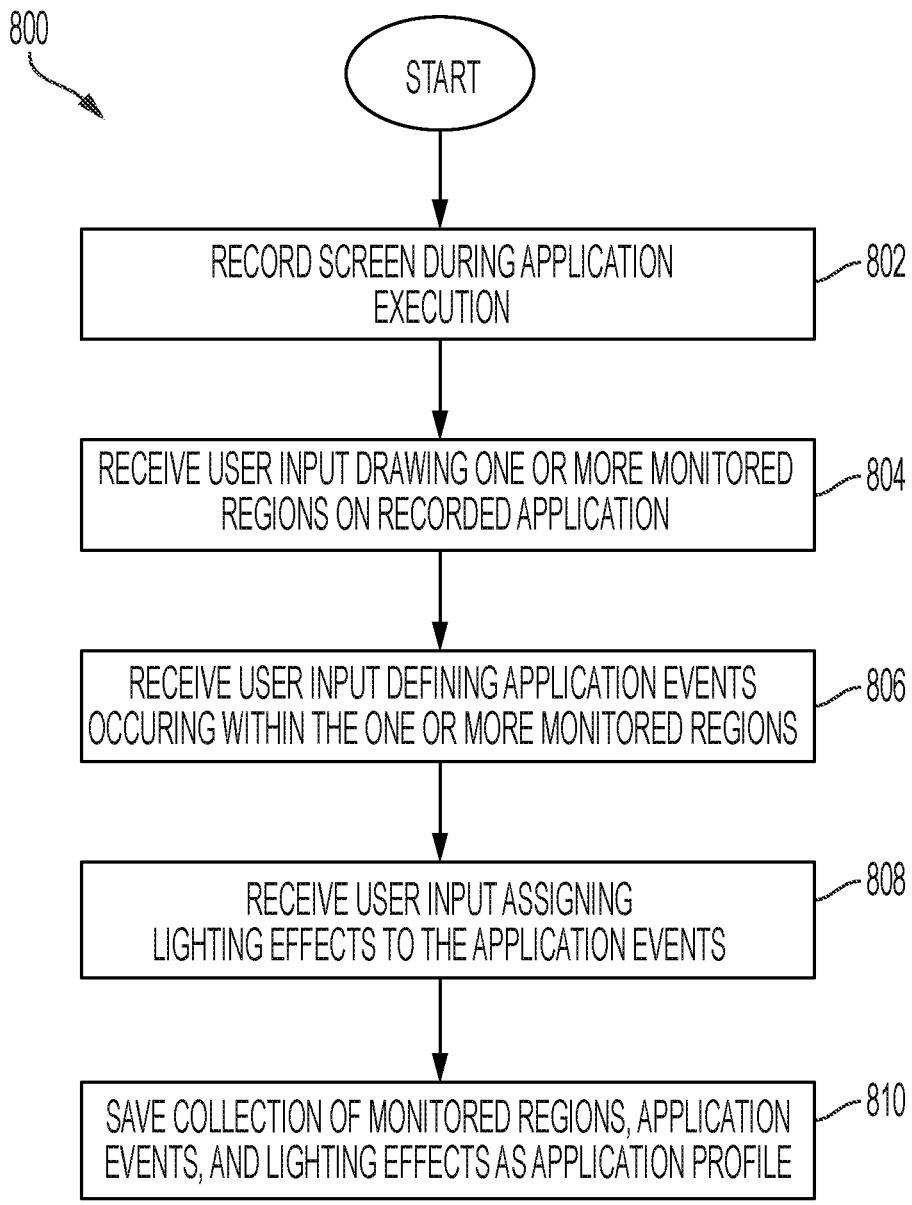
FIG. 8 is a flow chart illustrating a method for manually entering lighting effects according to some embodiments of the disclosure.
Figure 9:
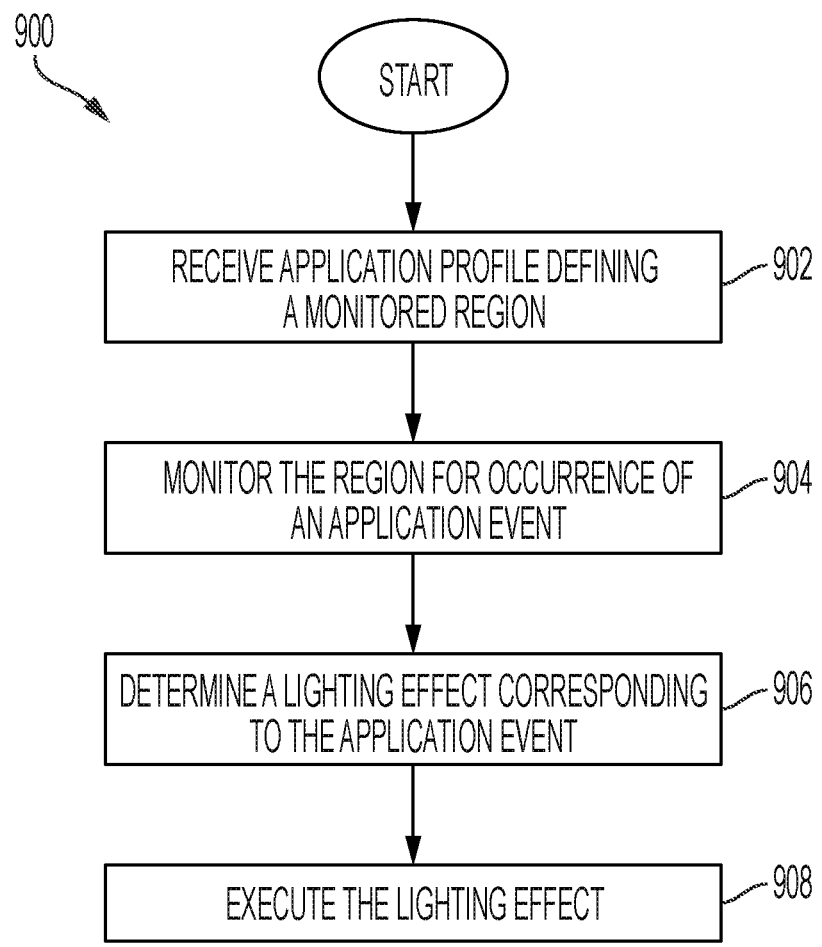
FIG. 9 is a flow chart illustrating a method for showing lighting effects according to some embodiments of the disclosure.

Example methods for implementing lighting effects are shown in flow chart diagrams of FIG. 8 and FIG. 9. FIG. 8 is a flow chart illustrating a method for manually entering lighting effects according to some embodiments of the disclosure. A method 800 begins at block 802 with recording screen rendering during application execution, such as recording gameplay. In some embodiments, the screen recording may include a single screen shot. Then, at block 804, a user may draw one or more monitored regions on the recorded application. Next, at block 806, the user may define application events that occur within the monitored regions. Then, at block 808, the user assigns lighting effects to the application events. Next, at block 810, the collection of monitored regions, application events, and lighting effects is saved as an application profile. That application profile may be assigned to the application recorded at block 802.

After application profiles are defined, whether by manual user entry as in FIG. 8 or otherwise obtained, such as through download from the Internet, the application profiles may be used to provide lighting effects during execution of an application as shown in FIG. 9. FIG. 9 is a flow chart illustrating a method for showing lighting effects according to some embodiments of the disclosure. A method 900 may begin at block 902 with receiving at the lighting processor an application profile defining a monitored region. In some embodiments, the lighting processor may also receive other definitions in the application profile, such as definitions of application events and lighting effects. At block 904, the lighting processor may monitor the defined region received at block 902 for the occurrence of an application event. The occurrence may be based on detecting the application event defined in an application profile, or may be based on automatically detecting application events. Next, at block 906, the lighting processor may determine a lighting effect corresponding to the application event detected at block 904. Then, at block 908, the determined lighting effect may be executed, such as by the lighting processor transmitting lighting effect commands to a device manager that translates the commands into hardware instructions. In some embodiments, the lighting processor may send hardware instructions directly to appropriate devices and/or cloud devices.

Figure 10:
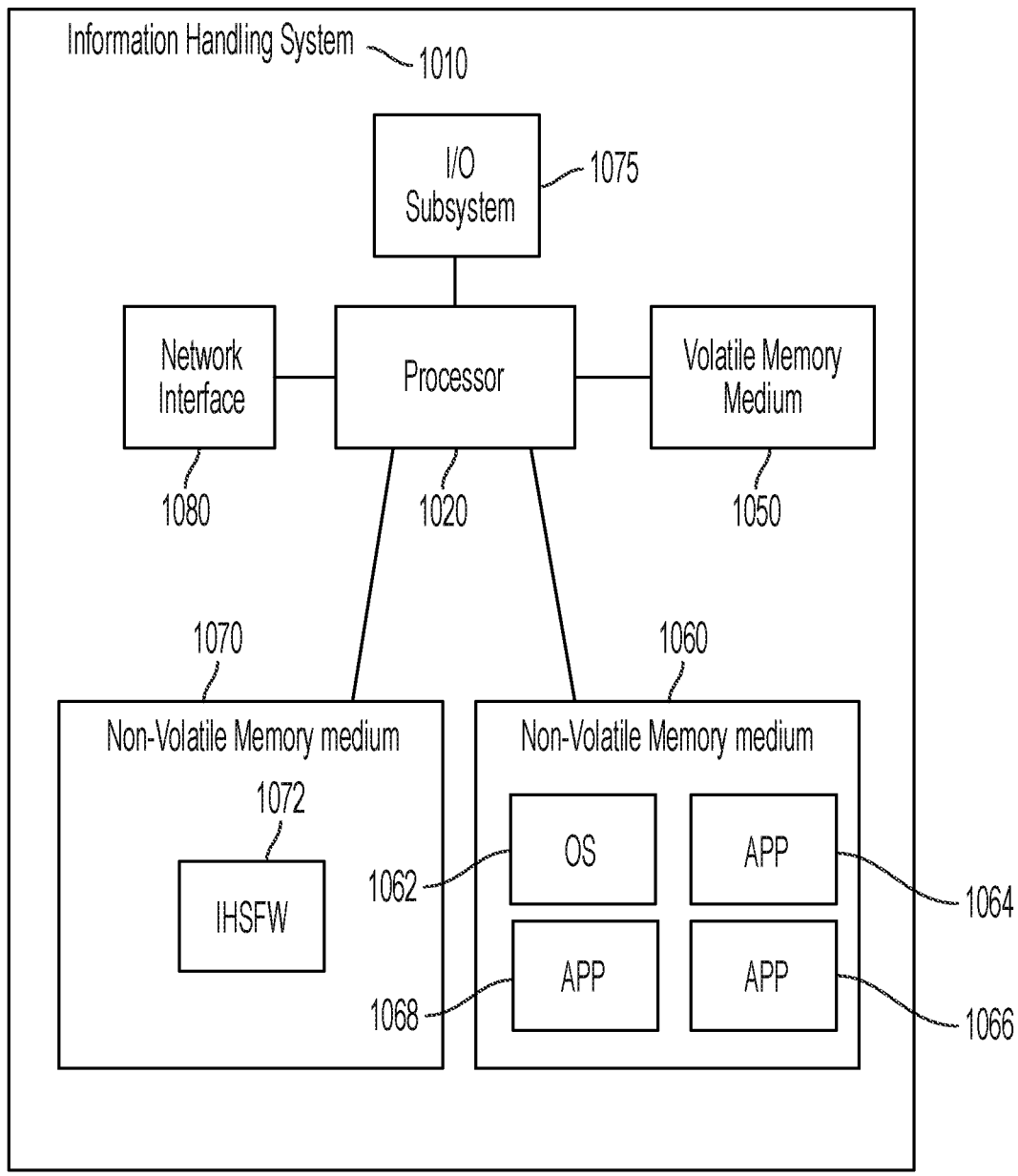
FIG. 10 is an example information handling system for implementing the lighting effects system described in various embodiments of this disclosure.

An example information handling system for implementing the lighting effects system described in various embodiments of this disclosure is shown in FIG. 10. An information handling system (IHS) 1010 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to some embodiments. For example, IHS 1010 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In some embodiments, a portable IHS 1010 may include or have a form factor of that of or similar to one or more of a laptop, a notebook, a telephone, a tablet, and a PDA, among others. For example, a portable IHS 1010 may be readily carried and/or transported by a user (e.g., a person). In some embodiments, components of IHS 1010 may include one or more storage devices, one or more communications ports for communicating with external devices as well as various input and output (EO) devices, such as a keyboard, a mouse, and a video display, among others. In some embodiments, IHS 1010 may include one or more buses operable to transmit communication between or among two or more hardware components. In one example, a bus of UTS 510 may include one or more of a memory bus, a peripheral bus, and a local bus, among others. In another example, a bus of IHS 1010 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In some embodiments, IHS 1010 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In some embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 1010 may include a processor 1020, a volatile memory medium 1050, nonvolatile memory media 1060 and 1070, an I/O subsystem 1075, and a network interface 1080. As illustrated, volatile memory medium 1050, non-volatile memory media 1060 and 1070, I/O subsystem 1075, and network interface 1080 may be communicatively coupled to processor 1020.

In some embodiments, one or more of volatile memory medium 1050, non-volatile memory media 1060 and 1070, I/O subsystem 1075, and network interface 1080 may be communicatively coupled to processor 1020 via one or more buses, one or more switches, and/or one or more root complexes, among others. In one example, one or more of volatile memory medium 1050, non-volatile memory media 1060 and 1070, I/O subsystem 1075, and network interface 1080 may be communicatively coupled to processor 1020 via one or more PCI-Express (PCIe) root complexes. In another example, one or more of an I/O subsystem 1075 and a network interface 1080 may be communicatively coupled to processor 1020 via one or more PCIe switches.

In some embodiments, the term "memory medium" may mean a "storage device", a "memory", a "memory device", a "tangible computer readable storage medium", and/or a "computer-readable medium." For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read only memory (EEPROM), and/or a flash memory, a solid state drive (SSD), or any combination of the foregoing, among others.

In some embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 1050 may include volatile storage such as, for example, RAM, DRAM (dynamic RAM), EDO RAM (extended data out RAM), SRAM (static RAM), etc. One or more of non-volatile memory media 1060 and 1070 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In some embodiments, a memory medium can include one or more volatile storages and/or one or more nonvolatile storages.

In some embodiments, network interface 1080 may be utilized in communicating with one or more networks and/or one or more other information handling systems. In one example, network interface 1080 may enable IHS 1010 to communicate via a network using a suitable transmission protocol and/or standard. In a second example, network interface 1080 may be coupled to a wired network. In a third example, network interface 1080 may be coupled to an optical network. In another example, network interface 1080 may be coupled to a wireless network.

In some embodiments, network interface 1080 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data using a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In some embodiments, processor 1020 may execute processor instructions in implementing one or more systems, one or more flowcharts, one or more methods, and/or one or more processes described herein. In one example, processor 1020 may execute processor instructions from one or more of memory media 1050-1070 in implementing one or more systems, one or more flowcharts, one or more methods, and/or one or more processes described herein. In another example, processor 1020 may execute processor instructions via network interface 580 in implementing one or more systems, one or more flowcharts, one or more methods, and/or one or more processes described herein.

In some embodiments, processor 1020 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 1020 may interpret and/or execute program instructions and/or process data stored locally (e.g., via memory media 1050-1070 and/or another component of UTS 1010). In another example, processor 1020 may interpret and/or execute program instructions and/or process data stored remotely (e.g., via a network storage resource).

In some embodiments, I/O subsystem 1075 may represent a variety of communication interfaces, graphics interfaces, video interfaces, user input interfaces, and/or peripheral interfaces, among others. For example, I/O subsystem 1075 may include one or more of a touch panel and a display adapter, among others. In one example, a touch panel may include circuitry that enables touch functionality in conjunction with a display that is driven by a display adapter.

As shown, non-volatile memory medium 1060 may include an operating system (OS) 1062, and applications (APPs) 1064-1068. In some embodiments, one or more of OS 1062 and APPs 1064-1068 may include processor instructions executable by processor 1020. In one example, processor 1020 may execute processor instructions of one or more of OS 1062 and APPs 1064-1068 via non-volatile memory medium 1060. In another example, one or more portions of the processor instructions of the one or more of OS 1062 and APPs 1064-1068 may be transferred to volatile memory medium 1050, and processor 1020 may execute the one or more portions of the processor instructions of the one or more of OS 1062 and APPs 1064-1068 via volatile memory medium 1050.

As illustrated, non-volatile memory medium 1070 may include information handling system firmware (IHSFW) 1072. In some embodiments, IHSFW 1072 may include processor instructions executable by processor 1020. For example, IHSFW 1072 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one example, processor 1020 may execute processor instructions of IHSFW 1072 via non-volatile memory medium 1070. In another instance, one or more portions of the processor instructions of IHSFW 1072 may be transferred to volatile memory medium 1050, and processor 1020 may execute the one or more portions of the processor instructions of IHSFW 1072 via volatile memory medium 1050.

In some embodiments, processor 1020 and one or more components of IHS 1010 may be included in a system-on-chip (SoC). For example, the SoC may include processor 1020 combined with one or more of a platform controller hub (not specifically illustrated), a volatile memory medium, a non-volatile memory medium, I/O controller, network interface, or other IHS component.

The schematic flow chart diagrams of FIG. 6, FIG. 7, FIG. 8, and FIG. 9 are generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The operations described above as performed by a controller may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random-access memory (DRAM), electronically programmable read-only memory (EPROM), or other memory devices. The logic circuitry may be configured through hard-wire connections or through programming by instructions contained in firmware. Further, the logic circuitry may be configured as a general-purpose processor capable of executing instructions contained in software and/or firmware.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc include compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although execution of methods on processors are described throughout the detailed description, aspects of the invention may be executed on different kinds of processors, such as graphics processing units (GPUs), central processing units (CPUs), digital signal processors (DSPs), and application-specific integrated circuits (ASICs). As another example, although processing of certain kinds of data in applications may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:

receiving an application profile, wherein the application profile comprises a first rule comprising a definition of a region, a definition of an application event associated with the region, and a definition of a lighting effect associated with the application event; and during execution, on an information handling system, of an application corresponding to the application profile:

monitoring the region of a window of the application for a change in displayed content in the region corresponding to the application event associated with the region by the first rule;

and executing the lighting effect associated with the application event in response to detecting the application event during monitoring the region of the window based on the first rule.

2. The method of claim 1, further comprising:

recording a screenshot of the window of the application before monitoring the region; and receiving an indication of the region from the user.

3. The method of claim 1, wherein the step of executing the lighting effect comprises transmitting an instruction to an attached keyboard having a plurality of lights corresponding to a plurality of keys of the keyboard, wherein the instruction comprises an assignment of a color to each of the plurality of lights.

4. The method of claim 1, wherein the step of executing the lighting effect comprises transmitting an instruction to a lighting device to display a color specified by the lighting effect.

5. The method of claim 1, wherein the step of monitoring the region comprises executing an algorithm to identify the change in displayed content without a pre-determined definition of the application event.

6. The method of claim 5, wherein the step of executing the algorithm to identify the change in displayed content comprises executing an algorithm to determine a first dominant color within the region.

7. The method of claim 6, wherein the step of executing the lighting effect comprises transmitting an instruction to an attached peripheral to display the first dominant color.

8. The method of claim 7, wherein the step of determining the lighting effect comprises analyzing the region of the window to determine a change from a first dominant color to a second dominant color occurred, and wherein the step of executing the lighting effect comprises transmitting an instruction to an attached peripheral to display the second dominant color.

9. The method of claim 1, wherein the step of determining the lighting effect comprises analyzing the region of the window to determine a percentage of pixels matching a specified color, and wherein the step of executing the lighting effect comprises transmitting an instruction to an attached peripheral to display a shade of the specified color corresponding to the determined percentage of pixels matching the specified color.

10. The method of claim 1, wherein the step of monitoring the region of a window comprises analyzing the region of the window to determine a percentage of pixels matching a specified color, and wherein the step of executing the lighting effect comprises transmitting an instruction to an attached peripheral having a plurality of lights to activate a percentage of the plurality of lights corresponding to the percentage of pixels matching the specified color.

11. The method of claim 1, wherein receiving an application profile comprises receiving an application profile defined by a user, receiving an application profile pre-defined as part of a software installation, and/or receiving an application from another information handling system.

12. An information handling system, comprising:
a processor configured to perform steps comprising:
receiving an application profile, wherein the application profile comprises a first rule comprising a definition of a region, a definition of an application event associated with the region, and a definition of a lighting effect associated with the application event; and
during execution, by the processor of the information handling system, of an application corresponding to the application profile:
monitoring the region of a window of the application for a change in displayed content in the region corresponding to the application event associated with the region by the first rule; and
executing the lighting effect associated with the application event in response to detecting the application event during monitoring the region of the window based on the first rule.

13. The information handling system of claim 12, wherein the processor is further configured to perform steps comprising:
recording a screenshot of the window of the application before monitoring the region; and
receiving an indication of the region from the user.

14. The information handling system of claim 12, wherein the step of executing the lighting effect comprises transmitting an instruction to an attached keyboard having a plurality of lights corresponding to a plurality of keys of the keyboard, wherein the instruction comprises an assignment of a color to each of the plurality of lights.

15. The information handling system of claim 12, wherein the step of executing the lighting effect comprises transmitting an instruction to a lighting device to display a color specified by the lighting effect.

16. The information handling system of claim 12, wherein the step of monitoring the region comprises executing an algorithm to identify the change in displayed content without a pre-determined definition of the application event.

17. The information handling system of claim 12, wherein receiving an application profile comprises receiving an application profile defined by a user, receiving an application profile pre-defined as part of a software installation, and/or receiving an application from another information handling system.

18. A method, comprising:
recording, by an information handling system, a screen shot of an application window during execution of an application;
receiving, by the information handling system from a user, a definition of an application profile comprising a first rule comprising a definition of a region of the application window for the application, a definition of an application event associated with the region, and a definition of a lighting effect associated with the application event;
determining, by the information handling system, that the application is executing;
monitoring, by the information handling system, the region defined by the application profile associated with the application for the application event associated with the region;
and
executing the lighting effect associated with the application event in response to the application event during monitoring the region of the window based on the first rule.

19. The method of claim 18, wherein the step of monitoring the monitored region comprises analyzing the monitored region to determine a dominant color within the monitored region, and wherein the step of determining the lighting effect comprises determining applying the dominant color as a displayed color by a device.

20. The method of claim 18, wherein the step of monitoring the monitored region comprises analyzing the monitored region of the window to determine a percentage of pixels matching a specified color, and wherein the step of executing the lighting effect comprises transmitting an instruction to an attached peripheral having a plurality of lights to activate a percentage of the plurality of lights corresponding to the percentage of pixels matching the specified color.

* * * * *